Dec. 4, 1962 W. H. DULLER 3,066,434
SUBSTANCE EMITTING FISH LURE DEVICE
Filed March 27, 1961

INVENTOR.
WILLIAM H. DULLER
BY
Howard M Herriot
ATTY.

United States Patent Office 3,066,434
Patented Dec. 4, 1962

3,066,434
SUBSTANCE EMITTING FISH LURE DEVICE
William H. Duller, 1324 Bennett St., Janesville, Wis.
Filed Mar. 27, 1961, Ser. No. 98,482
7 Claims. (Cl. 43—42.06)

This invention relates in general to fish lures and in particular to fish lures provided with means for emitting fish-attracting substances therefrom.

More particularly, this invention relates to simple, novel and advantageous means, in such lures, for piercing and holding a capsule containing the fish-attracting substance and for attracting fish and hooking fish striking the capsule.

An object of the invention is to provide, in such lures, a convenient and simple means of incorporating the capsule into a fish lure body so that a portion of the capsule is exposed for the fish to strike at, and yet held in place efficiently.

Another object is to provide, in such lures, a capsule that is rapidly softenable in water to create a soft, pliable, skin-like, living effect, and yet slowly soluble in water so if lost from the lure it will dissolve and leave no debris in the water.

Still another object is to provide, in such lures, a capsule held in place and pierced by a means also capable of hooking fish.

A further object is to provide, for such lures, a capsule which is transparent, relatively rapidly water softenable, relatively slowly water soluble, and of material which is harmless food for fish.

Another object is to provide, in such lures, an arrangement permitting adjustment of the length of the capsule and of the exposed portion of the capsule, as desired and/or as dictated by the species of fish being lured and/or the season of the year.

A still further object is to provide a simple, novel and advantageous fish lure of the substance emitting type.

These and other objects, features and advantages of the invention will become more readily apparent upon considering the following description of the invention when taken in conjunction with the accompanying drawings, wherein.

Figure 1:
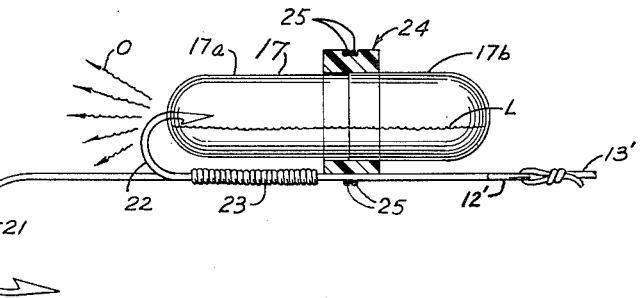
FIG. 1 is a side elevational view, partly in longitudinal section, of a lure, illustrating an embodiment of the invention.

Referring now to FIGS. 1–6, inclusive, there is shown a lure comprising a long shank main hook 21, a shorter shank smaller hook 22 (which is the piercing-and-holding means for the capsule as well), a wire securement 23 fixing hooks 21 and 22 together, a lure body 24, and a capsule. The lure body 24 has a longitudinally extending slot 24c through one side thereof. The slot fits the body onto the shank of the main hook. The lure body has a groove 24b running therearound, and a wire 25 lies in the groove and connects the lure body 24 to the shank of main hook 21. The lure body 24 has a longitudinal bore 24a therethrough for receiving the capsule.

A substantial portion of the capsule, i.e. most of half capsule 17a, is exposed beyond the trailing end of the lure body 24.

At the leading end of the lure there is provided line attaching means, such as the hook eye 12', for attachment to line 13'.

As shown in FIG. 1 the capsule 17 is a two-part gelatin capsule, made up of a capsule-half 17a and a capsule-half 17b, both transparent, relatively rapidly water softenable, and relatively slowly water-soluble. The capsule contains a liquid fish-attracting substance L of any suitable substance such as cod liver oil, fish blood, or juice of crushed worms. The capsule-halves 17a, 17b are set to the preferred length, as desired, by telescopically adjusting them, and preferably are set so that the open end of the exterior capsule-half lies inside of lure body 24. A frictional fit between bore 24a and the capsule retains the adjustment so set. The hooked piercing, holding, and fish-hooking means 22 pierces the capsule as it is inserted into the lure body and pushed against the barbed point, and the barbed point passes through the wall of the capsule to lie entirely within the capsule. Pulling on line 13' to pull the lure through the water, causes emission of liquid L from the capsule as explained above in connection with the previously described embodiment.

Figure 2:
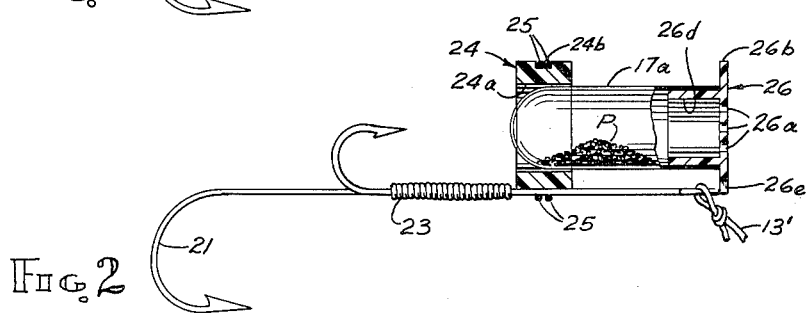
FIG. 2 is a side elevational view, partly in longitudinal section, of still another lure, illustrating the preferred embodiment of the invention, and showing the capsule only partly inserted into the lure body.
Figure 3:
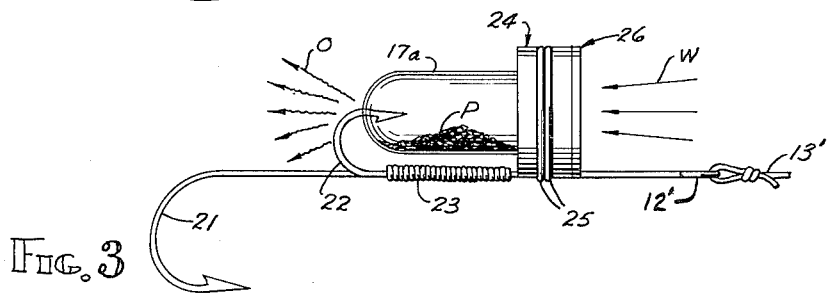
FIG. 3 is a side elevational view of the lure shown in FIG. 2, showing the capsule completely inserted into the lure body and pierced by the hooked piercing-and-holding means.
Figure 4:
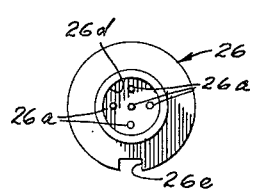
FIG. 4 is an end view of the plug portion of the capsule shown in FIGS. 2 and 3.
Figure 5:
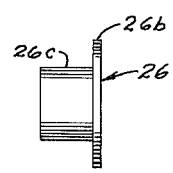
FIG. 5 is a side elevational view of said plug portion.
Figure 6:
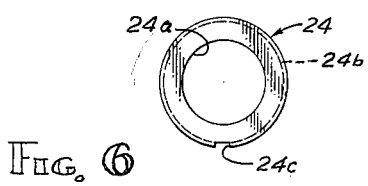
FIG. 6 is an end view of the lure body shown in FIGS. 1, 2 and 3.

As shown in FIGS. 2 and 3, the preferred embodiment differs from the embodiment just described in having a capsule comprised of one half-capsule (17a) and a plug 26. The substance P within the capsule is a fish attracting substance of any suitable composition, preferably powder, granules or pellets, but liquid is operable as well and may be used if desired. The plug 26 has holes 26a therein and a bore 26d, which connect the interior of capsule-half 17a to the exterior of plug 26. The plug has a flange 26b extending outwardly from its shaft portion 26c, so that the plug may be easily inserted into the capsule half 17a to form a capsule and then the capsule inserted into bore 24a of lure body 24 and shoved home until the flange 26b butts against the lure body, as is illustrated by viewing FIGS. 2 and 3 in that order.

As the capsule is thus inserted and shoved home, the barbed point of means 22 pierces the capsule as hereinabove described, and retains it, and is positioned for fish catching, also all as above described.

The flange 26b has through one side thereof a longitudinal slot 26e which envelopes the shank of main hook 21 and aids in aligning the capsule with bore 26a when inserting the capsule therein.

The holes 26a are water-entry openings, permitting water to enter the capsule, as shown by the arrows W in FIG. 3, as the lure is pulled through the water, to mix with and dissolve the substance P and emit a solution of said substance through the pierced opening as indicated in FIG. 3 by wavy-line arrows O.

The bore 24a of the lure body 24 may, if desired, be an easy frictional fit so as to help secure the capsule in place and hold it still. However, if action of the capsule is desired, the bore may be a loose fit, so that the capsule may have reciprocal motion therethrough, and a sidewise jiggling motion as well, to add action attraction to the lure when it is in use. The barbed portion of the point of means 22 acts as a stop to limit movement of the capsule in one direction (toward the leading end of the lure), and the hooked or curved portion of means 22 acts as a stop to limit movement of the capsule in the other direction. In the embodiment illustrated in FIGS. 2 and 3, the flange 26b of plug 26 limits movement of the capsule in said other direction. The force created against the capsule, when retrieving the lure, tends to move the capsule toward the trailing end of the lure, while a sudden stop in retrieving, through inertia, tends to move the capsule toward the leading end of the lure.

It will be apparent from the foregoing description and the following claims that this invention provides a simple, inexpensive, and advantageous lure of versatility and great effectiveness. Although but a few embodiments of this invention have been shown and described, changes can be made without departing from the principles and spirit of the invention, the scope of which is defined in the following claims. Accordingly, the foregoing is to be considered illustrative, rather than restrictive of the invention, and those modifications which come within the meaning and range of equivalency of the claims are to be included therein.

The invention claimed is:

1. A fish lure comprising a capsule adapted to contain a fish-attracting substance, a body having a bore therethrough for receiving said capsule and exposing a portion thereof beyond one end of said body, and a fishhook having a barbed point disposed beyond said body at said end and in line with said bore for piercing said capsule when said capsule is inserted into said bore from the other end of said body.

2. The invention described in claim 1 wherein said body and said point are so dimensioned and positioned and said capsule is formed in two parts telescopically adjustable for varying the overlap of said parts so that variations may be made, as desired, in the amount of said capsule exposed from said other end of said body.

3. The invention described in claim 1 wherein said capsule has water entry perforations therein at the end thereof opposite the end pierced by said point, whereby water is admitted into the capsule as the lure moves through the water emitting said substance from said capsule where pierced by said point.

4. A fish lure for use with a half-capsule adapted to contain a fish-attracting substance, comprising: a plug fitting the open end of said half-capsule to form together therewith a capsule; a body having a bore therethrough for receiving said capsule and exposing a major portion of said half-capsule beyond one end of said body; and hooked means having a barbed point disposed beyond said body at said end and in line with said bore for piercing the closed end of said half-capsule when said capsule is inserted into said bore from the other end of said body, for holding said capsule on said lure, and for hooking fish striking said capsule.

5. The invention described in claim 4 wherein said plug has an opening therethrough for admitting water into the capsule as the lure is moved through the water emitting said substance from said capsule where pierced by said point.

6. The invention described in claim 5 wherein said lure has line attaching means disposed at the end of the lure adjacent said other end of said body.

7. The invention described in claim 6 wherein said body is attached to a large fishhook, and said hooked means is a small fishhook also attached to said large fishhook.

References Cited in the file of this patent

UNITED STATES PATENTS

| | | |
|---|---|---|
| 2,102,739 | Peters | Dec. 21, 1937 |
| 2,423,717 | Mikina | July 8, 1947 |
| 2,518,593 | Bell | Aug. 15, 1950 |
| 2,674,058 | Lindenberg | Apr. 6, 1954 |
| 2,754,614 | Yakel | July 17, 1956 |
| 2,825,174 | Leinonen | Mar. 4, 1958 |
| 2,827,376 | Breuer | Mar. 18, 1958 |
| 2,914,883 | Kustusch | Dec. 1, 1959 |

FOREIGN PATENTS

| | | |
|---|---|---|
| 243,199 | Great Britain | Nov. 26, 1925 |
| 811,570 | France | Jan. 18, 1937 |